US007796126B2

(12) United States Patent
Kida et al.

(10) Patent No.: US 7,796,126 B2
(45) **Date of Patent: *Sep. 14, 2010**

(54) LIQUID CRYSTAL DISPLAY DEVICE, METHOD OF CONTROLLING THE SAME, AND MOBILE TERMINAL

(75) Inventors: Yoshitoshi Kida, Kanagawa (JP); Yoshiharu Nakajima, Kanagawa (JP); Toshikazu Maekawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 734 days.

This patent is subject to a terminal disclaimer.

(21) Appl. No.: 11/789,216

(22) Filed: Apr. 23, 2007

(65) Prior Publication Data

US 2007/0195037 A1 Aug. 23, 2007

Related U.S. Application Data

(63) Continuation of application No. 10/485,280, filed as application No. PCT/JP03/06857 on May 30, 2003, now Pat. No. 7,209,132.

(30) Foreign Application Priority Data

May 31, 2002 (JP) .......................... P2002-159032

(51) Int. Cl.
*G06F 3/038* (2006.01)

(52) U.S. Cl. ........................................ 345/211; 345/87

(58) Field of Classification Search ........... 345/87–100, 345/204–20, 211–213
See application file for complete search history.

(56) References Cited

U.S. PATENT DOCUMENTS

| | | | | |
|---|---|---|---|---|
| 6,639,590 | B2 | 10/2003 | Takashi et al. | |
| 7,038,740 | B1 | 5/2006 | Katsuya | |
| 7,209,132 | B2 * | 4/2007 | Kida et al. | 345/211 |
| 2002/0196223 | A1 | 12/2002 | Takashi et al. | |
| 2003/0128306 | A1 | 7/2003 | Kai | |

(Continued)

FOREIGN PATENT DOCUMENTS

| | | |
|---|---|---|
| JP | 61-052683 | 3/1986 |

(Continued)

*Primary Examiner*—Kimnhung Nguyen
(74) *Attorney, Agent, or Firm*—Robert J. Depke; Rockey, Depke & Lyons, LLC

(57) ABSTRACT

A liquid crystal display device enabling a reduction in size and costs associated with the system as a whole, starting to display images without image distortion at power on time, and turning the screen off without image retention at power off time, a method of controlling the liquid crystal display device, and a mobile terminal incorporating the liquid crystal display device as a screen display. On a glass substrate (11) provided with a display unit (12), peripheral drive circuits such as an interface circuit (13), a timing generator (14), a reference voltage driver (15), a CS driver (18), a VCOM driver (19), and a voltage regulation circuit (20), together with a horizontal driver (16) and a vertical driver (17) are disposed. When a display reset control pulse PCI is supplied from an external source, a predetermined voltage is written into pixels while a CS voltage and a VCOM voltage adjusted to the same level as that of a pixel voltage are applied to a common-electrode-side. This allows the screen to turn white in a normally white type liquid crystal display, and to turn black in a normally black type liquid crystal display. Image distortion at power on/off time can thus be prevented.

7 Claims, 7 Drawing Sheets

U.S. PATENT DOCUMENTS

| | | | |
|---|---|---|---|
| 2003/0160775 | A1 | 8/2003 | Kumuda et al. |
| 2003/0184538 | A1 | 10/2003 | Yamato et al. |
| 2004/0239609 | A1 | 12/2004 | Lee et al. |

FOREIGN PATENT DOCUMENTS

| | | | |
|---|---|---|---|
| JP | 01-170986 | | 7/1989 |
| JP | 01-170986 | | 12/1989 |
| JP | 02-272490 | | 11/1990 |
| JP | 04-195025 | | 7/1992 |
| JP | 06-118893 | | 4/1994 |
| JP | 07-020439 | | 1/1995 |
| JP | 11-202842 | | 7/1999 |
| JP | 2001-209355 | | 8/2001 |
| JP | 2004-004243 | | 1/2004 |
| JP | 3741079 | | 2/2006 |
| WO | WO 01/73737 | | 10/2001 |
| WO | WO 01/73737 | A1 | 10/2001 |

* cited by examiner

LIQUID CRYSTAL DISPLAY DEVICE, METHOD OF CONTROLLING THE SAME, AND MOBILE TERMINAL

The subject matter of application Ser. No. 10/485,280 is incorporated herein by reference. The present application is a continuation of U.S. Application Ser. No. 10/485,280, filed Jan. 29, 2004, now U.S. Pat. No. 7,209,132 is a 371 U.S. National Stage filing of PCT/JP2003/06857, filed May 30, 2003, which claims priority to Japanese Patent Application No. JP2002-159032, filed May 31, 2002. The present application claims priority to these previously filed applications.

TECHNICAL FIELD

The present invention relates to liquid crystal display devices, methods of controlling the same, and mobile terminals. In particular, the present invention relates to a liquid crystal display device wherein a display unit and a peripheral drive circuit are integrated on the same transparent insulating substrate, a method of controlling the liquid crystal display device at power on/off time, and a mobile terminal incorporating the liquid crystal display device as a screen display.

BACKGROUND ART

To prevent image distortion at power on/off time in a normally white type liquid crystal display, “white” data is written into pixels at power on/off time for turning the screen white. In the case of a normally black type liquid crystal display, “black” data is written into pixels at power on/off time for turning the screen black. More specifically, at power on time, image distortion is first eliminated by turning the screen white (or black) for subsequently displaying images corresponding to display data. At power off time, image retention is first eliminated by turning the screen white (or black) for subsequently turning the screen off.

In writing “white” (or “black”) data into pixels, a conventional liquid crystal display device requires an external source from which “white” (or “black”) data is derived. The conventional liquid crystal display further requires drivers mounted on an external substrate or an external driver integrated circuit (IC) for adjusting a VCOM voltage, which is applied to a common electrode of a liquid crystal capacitor in a pixel, and a CS voltage, which is applied to an electrode adjacent to the common electrode of a storage capacitor, to “L” level.

Referring to FIG. 7, a display unit 102 having pixels arranged in a matrix is disposed on a glass substrate 101. A horizontal driver 103 is disposed below the display unit 102 for writing display data into each pixel of the display unit 102. A vertical driver (not shown) is disposed beside the display unit 102. The glass substrate 101 is electrically connected to an external substrate 105 via a flexible cable (substrate) 104.

The external substrate 105 has a timing generator (TG) 106, a VCOM driver 107, and a CS driver 108. The timing generator 106 generates various timing signals based on reference signals such as a master clock MCK, a vertical synchronization signal Vsync, and a horizontal synchronization signal Hsync that are provided by a graphic controller adjacent to a control unit. The various timing signals generated are supplied to the horizontal driver 103 and the vertical driver via the flexible cable 104. At power on/off time, the timing generator 106 generates and supplies “white” (or “black”) data to the horizontal driver 103.

The VCOM driver 107 generates a VCOM voltage in synchronization with timing signals from the timing generator 106, and applies the VCOM voltage to each common electrode of a liquid crystal capacitor in all pixels via the flexible cable 104. The CS driver 108 generates a CS voltage in synchronization with timing signals from the timing generator 106, and applies the CS voltage to the electrode adjacent to the common electrode of a storage capacitor in all pixels via the flexible cable 104. At power on/off time, both the VCOM driver 107 and the CS driver 108 adjust the VCOM voltage and the CS voltage, respectively, to a low level.

In a conventional liquid crystal display device, as described above, the external substrate 105 (or an external driver IC) is interposed between a control unit and the liquid crystal display device for preventing an image distortion at power on/off time. Moreover, a circuit for generating “white” (or “black”) data and circuits for adjusting the VCOM voltage and the CS voltage to a low level are mounted on the external substrate 105 (or an external driver IC). This prevents a reduction in size and costs associated with the system as a whole, due to the steps involved in disposing the external substrate 105, as well as mounting the timing generator 106, the VCOM driver 107, and the CS driver 108 thereon.

Accordingly, an object of the present invention is, while enabling a reduction in size and costs associated with the system as a whole, to provide a liquid crystal display device that can start displaying images without image distortion at power on time, a liquid crystal display device that can turn the screen off without image retention at power off time, a method of controlling the liquid crystal display device, and a mobile terminal incorporating the liquid crystal display device as a screen display.

DISCLOSURE OF INVENTION

A liquid crystal display device according to the present invention comprises a display unit wherein pixels are arranged in a matrix on a transparent insulating substrate, switching means for selecting and supplying a display signal to each pixel of the display unit, while selecting and supplying a predetermined voltage instead of the display signal at power on/off time, and voltage-generating means mounted together with the display unit on the transparent insulating substrate and applying a common voltage to the common-electrode-side of all the pixels, while applying a voltage having the same level as that of the predetermined voltage instead of the common voltage to the common-electrode-side of all the pixels at power on/off time. The common voltage refers to a voltage applied to the common electrodes of liquid crystal cells, and also to a voltage applied to electrodes adjacent to the common electrodes of storage capacitors. This liquid crystal display device is incorporated, as a screen display, into personal digital assistants (PDAs) and mobile terminals such as mobile telephones.

The liquid crystal display device or a mobile terminal incorporating this liquid crystal display device as a screen display follow the process of turning the power on at power on time, initializing circuits on the transparent insulating substrate, and writing a predetermined voltage into each pixel of the display unit for a certain period of time, while applying a voltage having the same level as that of the predetermined voltage to the common-electrode-side of the pixels. This allows the screen of a normally white type display to turn white (the screen turns black in a normally black type display) over a certain period of time after turning the power on. Thus, image display can be started without distortion at power on time. At power off time, a predetermined voltage is written into each pixel of the display unit for a certain period of time, while a voltage having the same level as that of the predetermined voltage is applied to the common-electrode-side of all the pixels. This allows the screen to turn white (or black) over a certain period of time before turning the power off. Thus, display can be terminated without image retention at power off time.

BEST MODE FOR CARRYING OUT THE INVENTION

The present invention will now be described in detail with reference to the accompanying drawings.

First Embodiment

Figure 1:
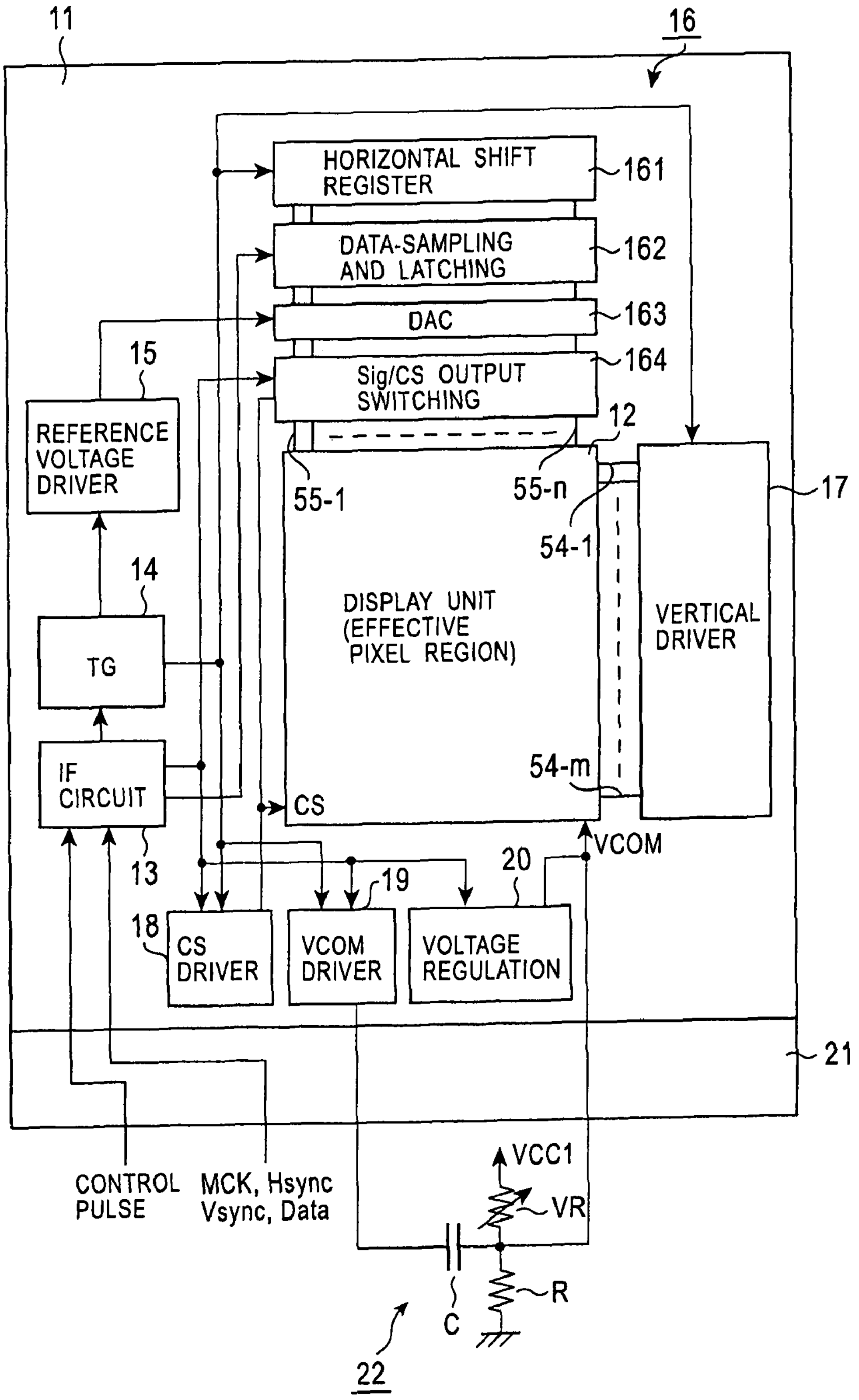
FIG. 1 is a block diagram of a liquid crystal display device according to a first embodiment of the present invention.

FIG. 1 is a block diagram of a liquid crystal display device according to a first embodiment of the present invention. In FIG. 1, a display unit (pixel region) 12 having pixels arranged in a matrix is formed on a transparent insulating substrate such as a glass substrate 11. The glass substrate 11 is opposed to another glass substrate with a predetermined distance therebetween. A liquid crystal material is disposed between the two substrates to form a display panel (LCD panel).

Figure 2:
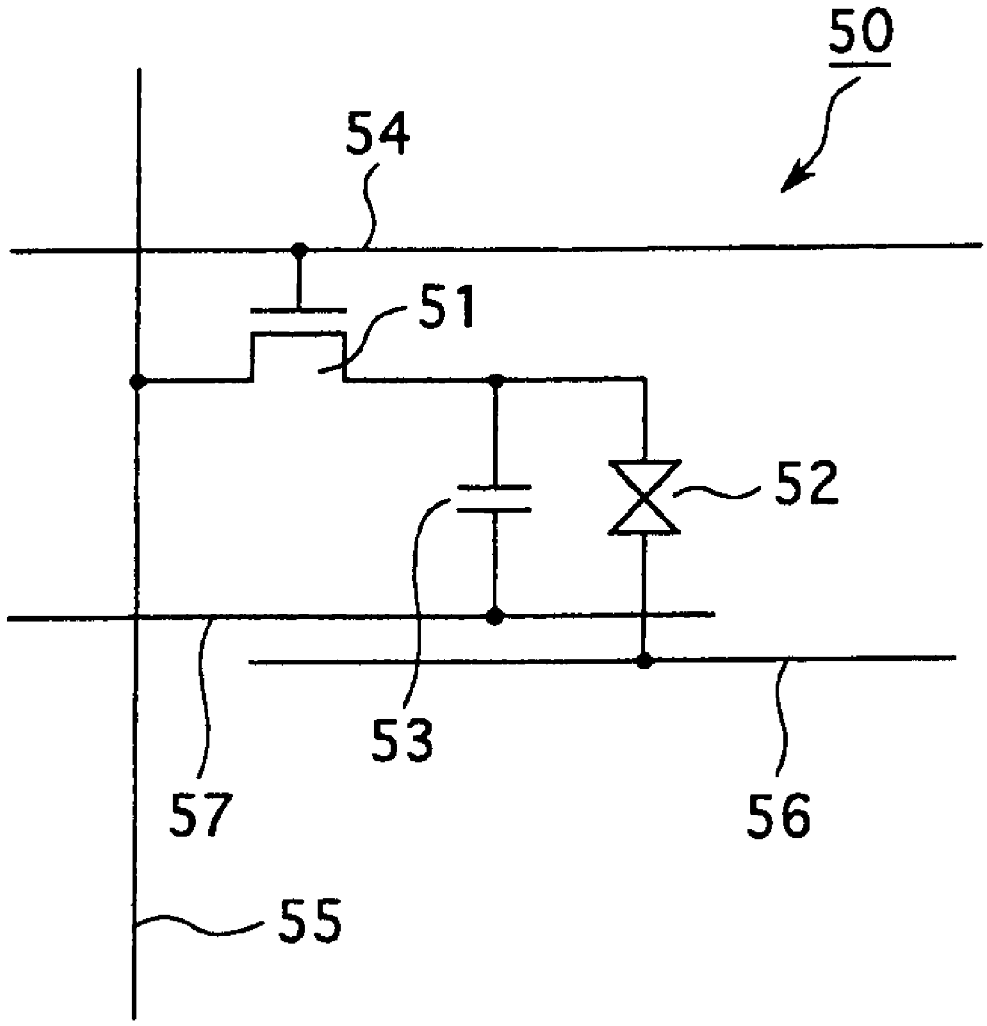
FIG. 2 is a circuit diagram showing an example of a pixel configuration.

FIG. 2 shows an example of a pixel configuration in the display unit 12. Each pixel 50 arranged in a matrix includes a thin film transistor (TFT) 51 as a pixel transistor, a liquid crystal cell 52, and a storage capacitor 53. The drain electrode of the TFT 51 is connected to the pixel electrode of the liquid crystal cell 52 and to one electrode of the storage capacitor 53. The liquid crystal cell 52 functions as a liquid crystal capacitor generated between the pixel electrode and the common electrode that are opposed with each other.

In this pixel, the gate electrode of the TFT 51 is connected to a gate line (scanning line) 54 while the source electrode of the TFT 51 is connected to a data line (signal line) 55. The common electrode of the liquid crystal cell 52 in each pixel is connected to the VCOM line 56. A common voltage VCOM (VCOM voltage) is applied to the common electrode of the liquid crystal cell 52 in each pixel via the VCOM line 56. The electrode adjacent to the common electrode of the storage capacitor 53 in each pixel is connected to a CS line 57.

In 1H (H: horizontal period) reverse driving or 1F (F: field period) reverse driving, the polarity of a display signal written into each pixel is reversed with respect to the VCOM voltage. When VCOM reverse driving, which reverses the polarity of the VCOM voltage during 1H period or 1F period, is executed together with the 1H reverse driving or the 1F reverse driving, the polarity of the CS voltage supplied to the CS line 57 is also reversed in synchronization with the VCOM voltage. The liquid crystal display device according to this embodiment does not exclusively use VCOM reverse driving. Since the level of the VCOM voltage and the CS voltage are substantially the same, they are collectively referred to as a common voltage in this specification.

Referring back to FIG. 1, on the glass substrate 11 provided with the display unit 12, an interface (IF) circuit 13, a timing generator (TG) 14, and a reference voltage driver 15 are disposed on the left of the display unit 12. Further, a horizontal driver 16 is disposed above the display unit 12, a vertical driver 17 is disposed on the right, and a CS driver 18 as a voltage regulator, a VCOM driver 19, and a voltage regulation circuit 20 are disposed below the display unit 12. These circuits and the pixel transistors of the display unit 12 are composed of low-temperature polysilicon or continuous grain (CG) silicon.

In the above-described liquid crystal display device, a master clock MCK, a horizontal synchronization pulse Hsync, a vertical synchronization pulse Vsync, display data Data including parallel inputs of red (R), green (G), and blue (B), and a display reset control pulse PCI that have low voltage amplitudes (e.g. an amplitude of 3.3 V) are transmitted from external sources to the glass substrate 11 via a flexible cable (substrate) 21, and are level-shifted to high voltage amplitudes (e.g. an amplitude of 6.5 V) in the interface circuit 13.

The master clock MCK, the horizontal synchronization pulse Hsync, and the vertical synchronization pulse Vsync that are level-shifted are supplied to the timing generator 14. The timing generator 14 then generates various timing pulses required for driving the reference voltage driver 15, the horizontal driver 16, and the vertical driver 17 based on the master clock MCK, the horizontal synchronization pulse Hsync, and the vertical synchronization pulse Vsync. The level-shifted display data Data is supplied to the horizontal driver 16. The display reset control pulse PCI, which is also level-shifted, is supplied to the horizontal driver 16, the CS driver 18, the VCOM driver 19, and the voltage regulation circuit 20.

The horizontal driver 16 has, for example, a horizontal shift register 161, a data-sampling and latching circuit 162, a digital-analog (DA) conversion circuit (DAC) 163, and a Sig/CS output switching circuit 164. The horizontal shift register 161 starts shifting in response to a horizontal start pulse HST supplied by the timing generator 14. Further, the horizontal shift register 161 generates a sampling pulse to be sequentially output during one horizontal period in synchronization with a horizontal clock pulse HCK supplied by the timing generator 14.

The data-sampling and latching circuit 162, during one horizontal period, sequentially samples and latches the display data Data output from the interface circuit 13 in synchronization with the sampling pulse generated in the horizontal shift register 161. A line of this latched digital data is transferred to a line memory (not shown) during a horizontal blanking period and is converted to an analog display signal in the DA conversion circuit 163. From reference voltages that correspond to the number of gray scales and that are supplied by the reference voltage driver 15, for example, the DA conversion circuit 163 selects a reference voltage corresponding to the digital data and outputs it as analog display data.

A line of analog display signal Sig from the DA conversion circuit 163 is supplied to the Sig/CS output switching circuit 164. A CS voltage generated at the CS driver 18 is also supplied to the Sig/CS output switching circuit 164. The Sig/CS output switching circuit 164 selects and outputs one of the analog display signal Sig or the CS voltage, depending on whether the level of the display reset control pulse PCI derived from the interface circuit 13 is high or low. The analog display signal Sig or the CS voltage from the Sig/CS output switching circuit 164 is further transmitted to data lines 55-1 to 55-n corresponding to the number of pixels "n" in the horizontal direction of the display unit 12.

The vertical driver 17 has a vertical shift register and a gate buffer. In this vertical driver 17, the vertical shift register starts shifting in response to a vertical start pulse VST supplied by the timing generator 14. Further, the vertical shift register generates a scanning pulse that is sequentially output, during one vertical period, in synchronization with a vertical clock pulse VCK supplied by the timing generator 14. The scanning pulse generated is sequentially output through the gate buffer into gate lines 54-1 to 54-m corresponding to the number of pixels "m" in the vertical direction of the display unit 12.

Vertical scanning by the vertical driver 17 permits the scanning pulses to be sequentially transmitted to the gate lines 54-1 to 54-m, and allows the pixels of the display unit 12 to be selected line by line. The analog display signals Sigs from the Sig/CS output switching circuit 164 are transmitted via the gate lines 55-1 to 55-n and written into each line of pixels selected. A repetition of this line-by-line writing operation displays an image for the complete screen.

The CS driver 18 generates and supplies the CS voltage to one electrode of the storage capacitor 53 in each pixel via the CS line 57 illustrated in FIG. 2. The CS driver 18 also supplies the CS voltage to the Sig/CS output switching circuit 164. When the display reset control pulse PCI from the interface circuit 13 is at a low level, the CS driver 18 adjusts the CS voltage to a predetermined level, for example, to a low level (0 V). When the display signal has an amplitude ranging from 0 to 3.3 V, for example, alternating-current driving of the CS voltage between 0 V (ground level) at low and 3.3 V at high is repeated, if VCOM reverse driving is applied.

The VCOM driver 19 generates the above-described VCOM voltage. When the level of the display reset control pulse PCI from the interface circuit 13 is low, the VCOM driver 19 adjusts the VCOM voltage to a low level (0 V). The VCOM voltage from the VCOM driver 19 is temporarily transferred to the outside of the glass substrate 11 via the flexible cable 21. The VCOM voltage transferred to the outside of the glass substrate 11 is returned, after passing through the VCOM adjustment circuit 22, to the glass substrate 11 via the flexible cable 21. The VCOM voltage is then applied to the common electrode of the liquid crystal cell 52 in each pixel via the VCOM line 56.

The VCOM voltage applied here is an alternating voltage having substantially the same amplitude as that of the CS voltage. In practice, as shown in FIG. 2, when a signal from the data line 55 is written into the pixel electrode of the liquid crystal cell 52 via the TFT 51, a voltage drop occurs at the TFT 51 due to parasitic capacitance. It is required therefore that the VCOM voltage applied be an alternating voltage that is direct current (DC)-shifted to compensate for the voltage drop. The DC-shifting of this VCOM voltage is carried out by the VCOM adjustment circuit 22.

The VCOM adjustment circuit 22 includes a capacitor C having an input terminal for the VCOM voltage, a variable resistor VR that is connected to both the output terminal of the capacitor C and an external power supply VCC1, and a resistor R that is connected to both the output terminal of the capacitor C and the ground. The VCOM adjustment circuit 22 adjusts the DC level of the VCOM voltage applied to the common electrode of the liquid crystal cell 52. That is, the VCOM adjustment circuit 22 applies a DC offset to the VCOM voltage. When the display reset control pulse PCI from the interface circuit 13 is at a low level, the voltage regulation circuit 20 forces the VCOM voltage supplied from the VCOM adjustment circuit 22 to the glass substrate 11 to drop to a low level (0 V).

When the display reset control pulse PCI supplied from an external source is at a low level, the CS driver 18 adjusts the CS voltage to a predetermined level, for example, to a low level (0 V), while the voltage regulation circuit 20 forces the VCOM voltage to drop to a low level (0 V). Further, the Sig/CS output switching circuit 164 selects and applies a CS voltage to the data lines 55-1 to 55-n, and thus enabling a display reset operation in the above-described liquid crystal display device.

As a result, in a line of pixels selected through vertical scanning by the vertical driver 17, a CS voltage (0 V in this example) is applied, as shown in FIG. 2, via the TFT 51 to the pixel-electrode-side of the liquid crystal cell 52 and the storage capacitor 53, while a VCOM voltage and a CS voltage (both 0 V) are applied via the VCOM line 56 and the CS line 57, respectively, to the common electrode side. No voltage is applied to the liquid crystal cell 52, and therefore, the screen turns white in a normally white type liquid crystal display and turns black in a normally black type liquid crystal display.

As described above, in the liquid crystal display device according to the first embodiment, peripheral drive circuits such as the interface circuit 13, the timing generator 14, the reference voltage driver 15, the CS driver 18, the VCOM driver 19, and the voltage regulation circuit 20, as well as the horizontal driver 16 and the vertical driver 17, are mounted together on the panel (glass substrate 11) where the display unit 12 is disposed. This display panel that incorporates all the drive circuits into one unit requires no external substrate, integrated circuit, or transistor circuit and therefore enables a reduction in size and costs associated with the system as a whole.

When a display reset control pulse PCI is supplied from an external source, a predetermined voltage is written into pixels while a CS voltage and a VCOM voltage adjusted to the same level as that of a pixel voltage are applied to a common-electrode-side. This allows the screen to turn white in a normally white type liquid crystal display, and to turn black in a normally black type liquid crystal display. Image distortion at power on/off time can thus be prevented, while enabling a reduction in size and costs associated with the system as a whole.

A method of controlling the liquid crystal display device during a display reset operation for preventing image distortion at power on/off time will now be explained.

Figure 3:
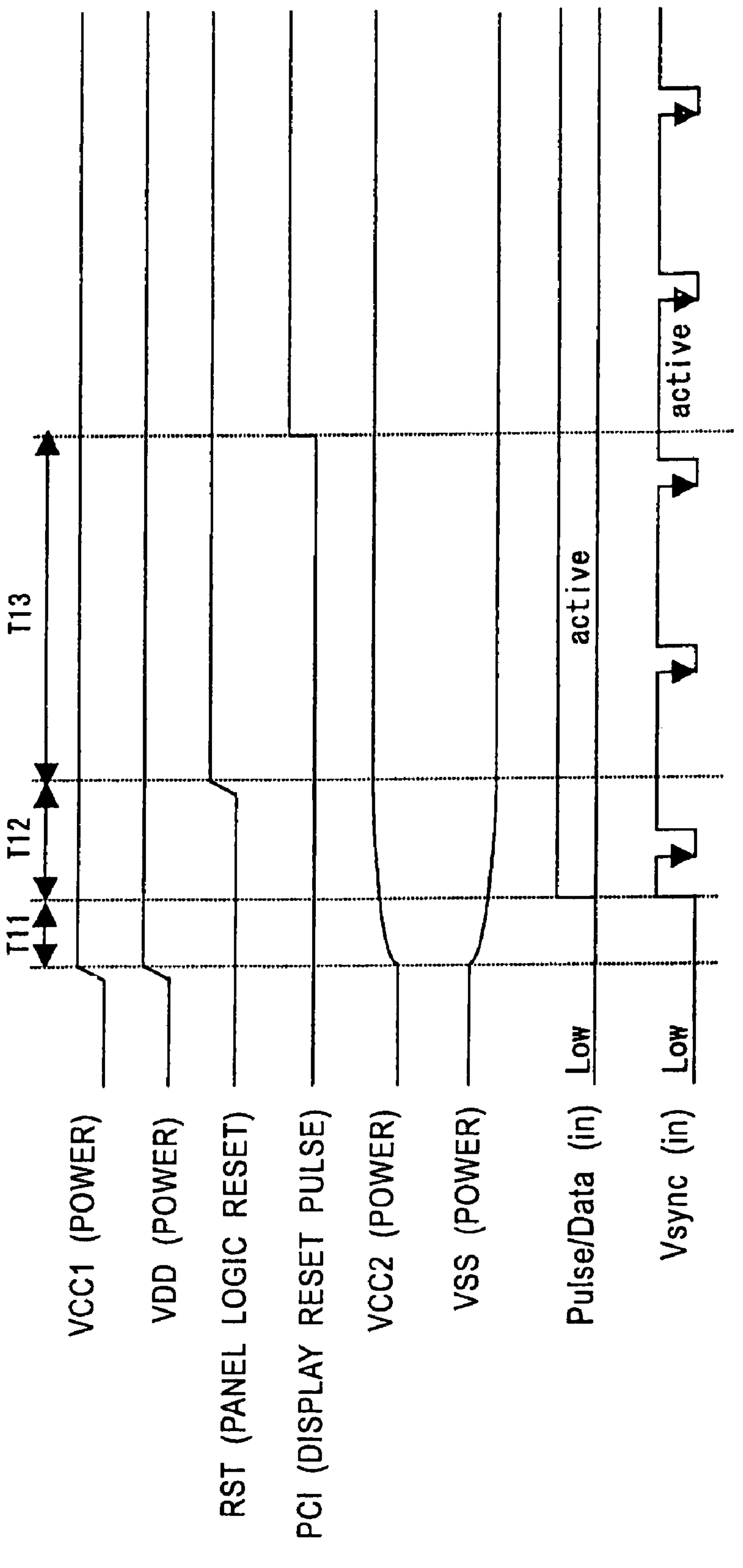
FIG. 3 is a timing chart for explaining a display reset operation at power on time.

FIG. 3 is a timing chart for explaining a display reset operation at power on time. A power VCC1 (e.g. 3.3 V) and a power VDD (e.g. 6.5 V) are first turned on at power on time. When the power VCC1 reaches 90% of the saturation level and a certain time period T11 (e.g. on the order of 1 msec) elapses, a master clock MCK, a horizontal synchronization pulse Hsync, a vertical synchronization pulse Vsync, display data Data, and a display reset control pulse PCI are input. from external sources via the flexible cable 21.

When the subsequent. time period T12 (e.g. on the order of 1 msec) elapses, a system reset pulse RST in the display panel is shifted to a high level. This determines (initializes) the initial state of a logical circuit, such as a flip-flop, in the display panel. Subsequently, the display reset control pulse PCI remains at a low level over a time period T13 (e.g. 1-2 field periods).

During this time period T13, the CS driver 18 adjusts the CS voltage to a predetermined level, for example, to a low level, while the voltage regulation circuit 20 forces the VCOM voltage to drop to a low level. Further, the Sig/CS output switching circuit 164 selects and applies a CS voltage to the data lines 55-1 to 55-n, thus enabling a display reset operation. That is, the screen turns white in a normally white type display and turns black in a normally black type display. After the time period T13, the display reset control pulse PCI is shifted to a high level. This allows the Sig/CS output switching circuit 164 to select and apply a display signal, instead of the CS voltage, to the data lines 55-1 to 55-n. An image corresponding to the display signal thus starts to be displayed.

The liquid crystal display device, at power on time, follows the process of turning the power on, initializing circuits on the display panel, and executing a display reset operation for a certain period of time. This allows the screen to turn and remain white (or black) over several field periods after the power is turned on. Image display can thus be started without distortion at power on time.

Figure 4:
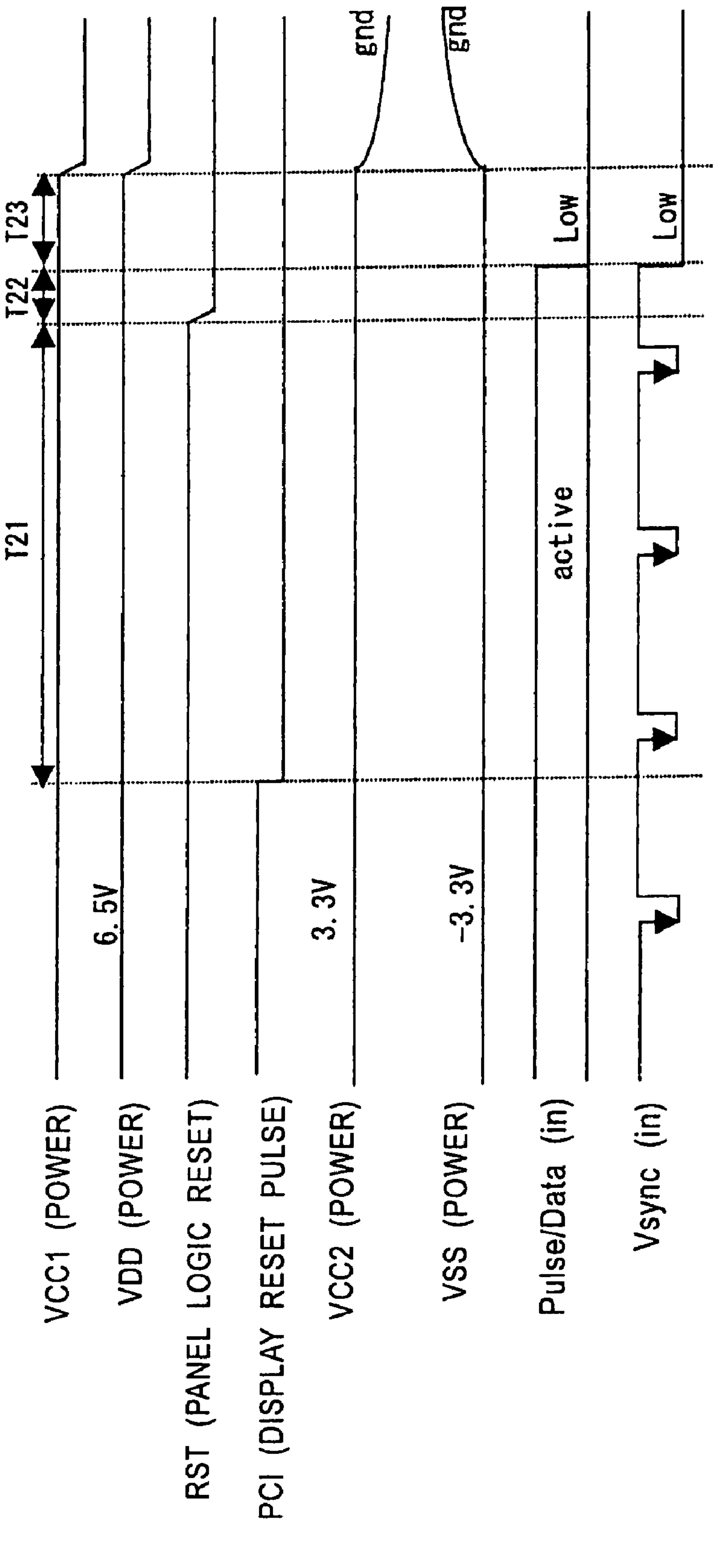
FIG. 4 is a timing chart for explaining a display reset operation at power off time.

FIG. 4 is a timing chart for explaining a display reset operation at power off time. The display reset control pulse PCI is, at power off time, first shifted to a low level over a certain time period T21 (e.g. 1-2 field periods). This allows the CS driver 18 to adjust the CS voltage to a low level, and the voltage regulation circuit 20 to force the VCOM voltage to drop to a low level. Further, the Sig/CS output switching circuit 164 selects and applies a CS voltage to the data lines 55-1 to 55-n. A display reset operation is thus enabled.

The display reset operation turns the screen white (or black) for several field periods. After the time period T21, the system reset pulse RST is shifted to a low level. When the subsequent time period T22 (e.g. on the order of 1 msec) elapses, inputs including a master clock MCK, a horizontal synchronization signal Hsync, a vertical synchronization signal Vsync, display data Data, and a display reset control pulse PCI via the flexible cable 21 are stopped. The power VCC1 and the power VDD are turned off when the next time period T23 (e.g. on the order of 1 msec) elapses.

The liquid crystal display device, at power off time, follows the process of executing a display reset operation for a certain period of time, allowing the screen to turn and remain white (or black) over several field periods before turning the power off, and subsequently turning the power off. Thus, display can be terminated without image retention at power off time.

This embodiment explains a method of controlling the liquid crystal display device in preventing image distortion at power on/off time. The controlling method can also be applied to a liquid crystal display device, for example, with a standby mode for power saving. When entering the standby mode, the method used to control the liquid crystal display device at power on time can be used. Similarly, when exiting the standby mode, the method used to control the liquid crystal display device at power off time can be used. Image distortion when entering/exiting the standby mode can thus be prevented.

Second Embodiment

Figure 5:
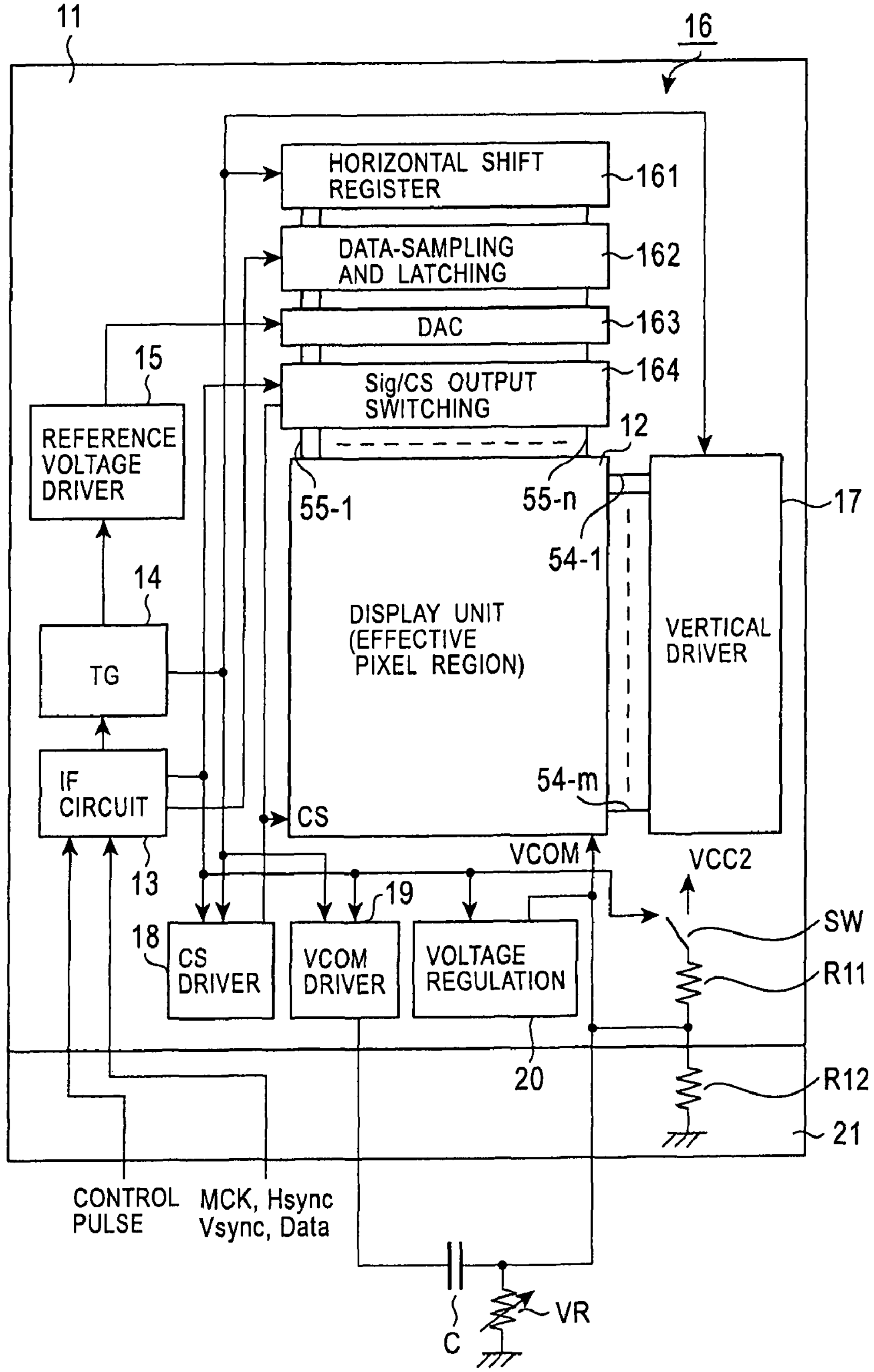
FIG. 5 is a block diagram of a liquid crystal display device according to a second embodiment of the present invention.

FIG. 5 is a block diagram of a liquid crystal display device according to a second embodiment of the present invention. Those components that are common to FIG. 1 are identified by the same numerals.

The liquid crystal display device according to the first embodiment has the VCOM adjustment circuit 22 entirely disposed outside the panel (outside of the glass substrate 11). The liquid crystal display device according to this embodiment, on the other hand, has a VCOM adjustment circuit 22' including some circuit elements that are disposed on the glass substrate 11.

In particular, the capacitor C, which is not easily disposed on the glass substrate 11, and the variable resistor VR, which requires external regulation, are disposed outside the glass substrate 11, as shown in FIG. 5. The variable resistor VR is connected to both the output terminal of the capacitor C and the ground. The glass substrate 11 has a voltage divider R11 and a switch SW that are connected in series and are disposed between a line L, which is electrically connected to the output terminal of the capacitor C, and an internal power VCC2. The glass substrate 11 also has a voltage divider R12 connected to both the line L and the ground. The switch SW is turned off when the display reset control pulse PCI from the interface circuit 13 is at a low level.

The VCOM adjustment circuit 22 entirely disposed outside the panel may cause instability of the display reset control pulse PCI at power off time, and may lead to an increased VCOM voltage if the external power VCC1 remains on (in the vicinity of 3.3 V). The liquid crystal display device according to this embodiment, on the other hand, has the VCOM adjustment circuit 22' that includes some circuit elements disposed on the glass substrate 11. In particular, the voltage divider R11, the voltage divider R12, and the switch SW for turning the voltage dividers R11 and R12 on/off are disposed on the glass substrate 11. The switch SW is turned off when the display reset control pulse PCI is at a low level. This adjusts the voltage of the line L to the ground level, preventing an increase in the VCOM voltage, and retaining the VCOM voltage at the ground level.

In the above-described embodiments, the supplied display reset control pulse PCI allows the Sig/CS output switching circuit 164 to select and apply the CS voltage, instead of a display signal, to the data lines 55-1 to 55-n. Since the VCOM voltage and the CS voltage are adjusted to the same level, a similar effect can be obtained by selecting and supplying the VCOM voltage to the data lines 55-1 to 55-n.

Instead of selecting one of the CS voltage or the VCOM voltage, adjusting the CS voltage and the VCOM voltage to the same level while selecting a predetermined voltage may also be possible. Further the level of voltage written into pixels via the data lines 55-1 to 55-n (pixel voltage) is not limited to 0 V (ground level). As long as the CS voltage and the VCOM voltage are adjusted to the same level as that of the pixel voltage, the screen turns white in a normally white type display and turns black in a normally black type display, because no voltage is applied to the liquid crystal cell 52. For minimizing power consumption, however, a pixel voltage of 0 V is advantageous because no power is required in writing into pixels via the data lines 55-1 to 55-n.

The liquid crystal display devices described in the first and second embodiments are suitable for use as screen displays in mobile terminals, which are small in size and light in weight, typified by mobile telephones and PDAs.

Figure 6:
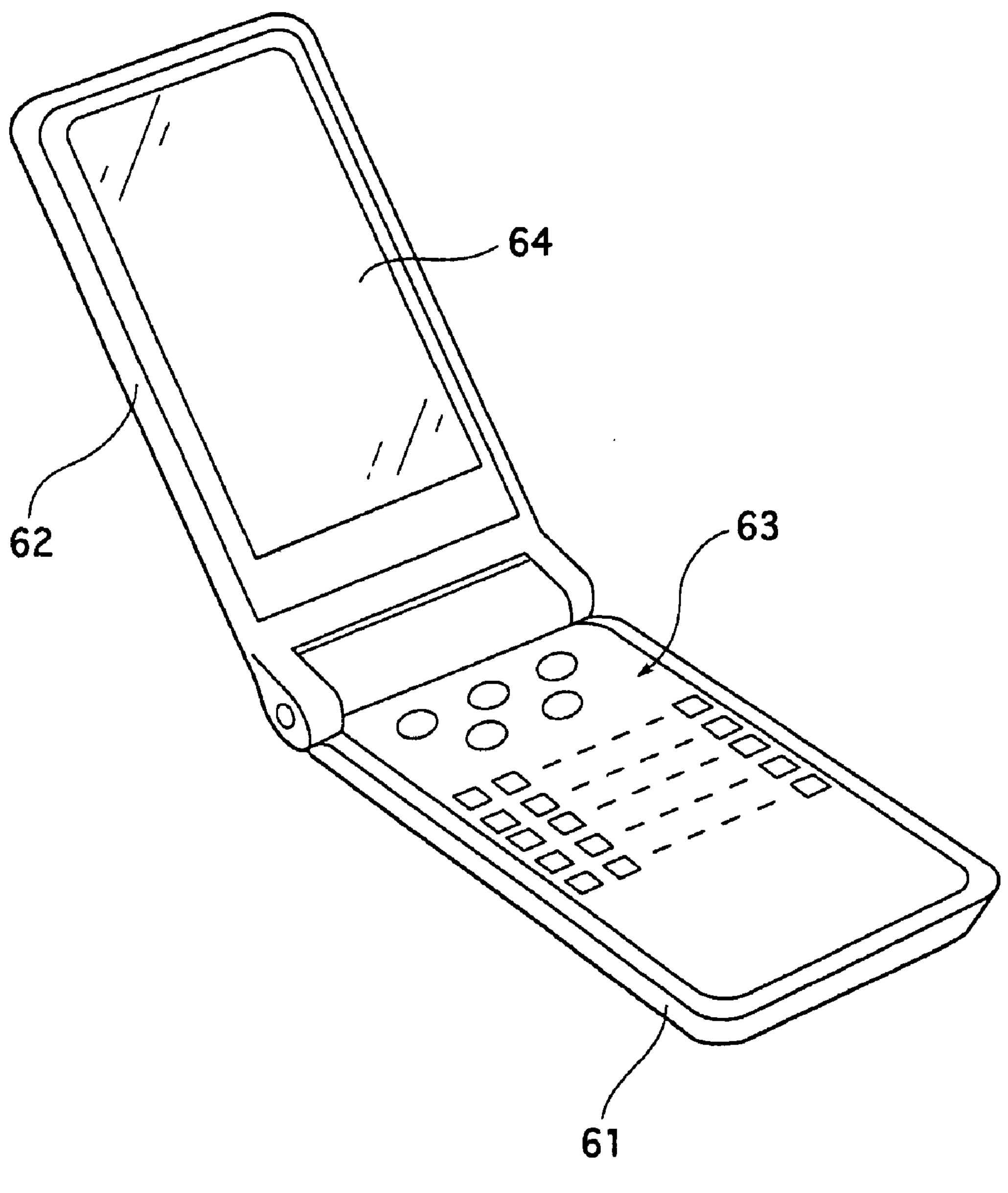
FIG. 6 is an external view showing a schematic diagram of a PDA according to the present invention.
Figure 7:
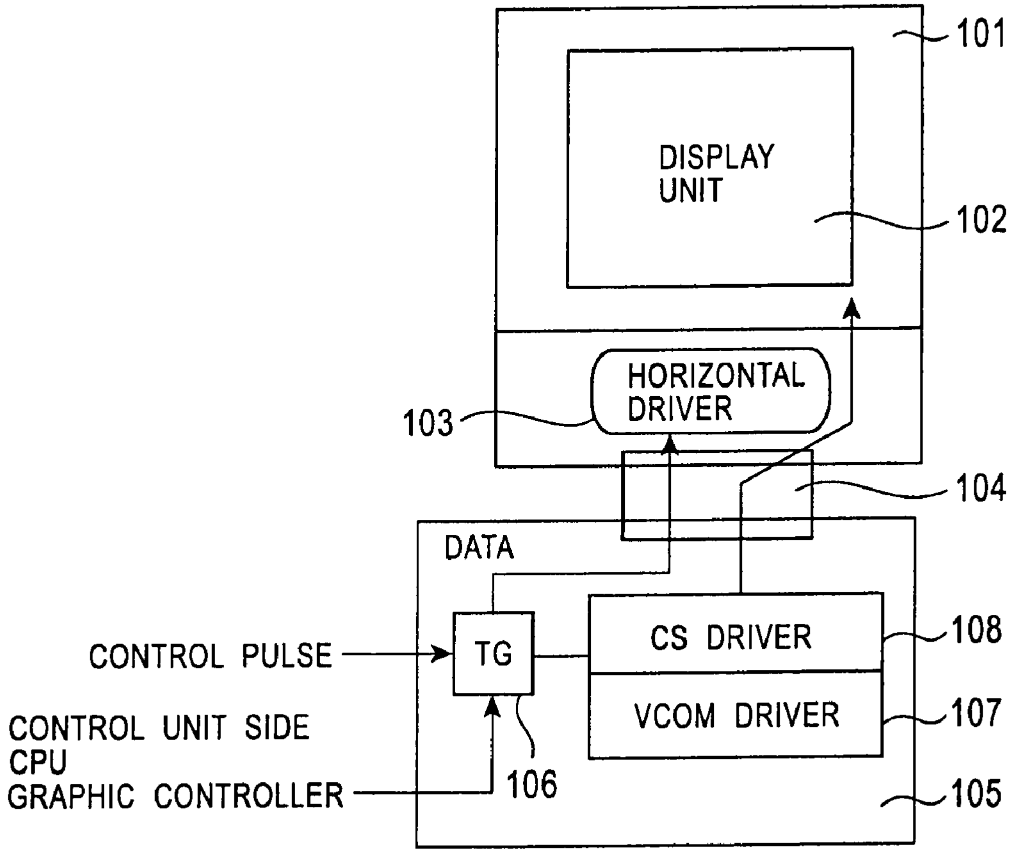
FIG. 7 is a block diagram of a liquid crystal display device according to a conventional art.

FIG. 6 is an external view showing a schematic diagram of a PDA, as an example of the mobile terminal according to the present invention.

The PDA has a flip-type lid 62 attached to a main body 61. An operating unit 63 with various keys, such as a keyboard, is on the top surface of the main body 61. A screen display unit 64 is disposed on the lid 62. The above-described liquid crystal display devices according to the first and second embodiments are used as the screen display unit 64.

As described above, the liquid crystal display according to the embodiments can prevent image distortion at power on/off time, while enabling a reduction in size and costs associated with the system as a whole. Incorporating the liquid crystal display device as the screen display unit 64 into the PDA, therefore, can prevent image distortion at power on/off time, while contributing a reduction in size of the PDA.

Mobile terminals such as PDAs of this type typically have a standby mode for power saving. Image distortion when entering/exiting the standby mode can be prevented, as described above, by the display reset operation used for preventing image distortion at power on/off time.

Although PDAs are mentioned in the above embodiment, application of the present invention is not limited to PDAs. The liquid crystal display device according to the present invention is suitable for mobile terminals in general that are small in size and light in weight, such as mobile telephones.

In the above-described liquid crystal display device according to the present invention, a display unit and peripheral drive circuits are integrated on the same transparent insulating substrate to form a display panel. Since no external substrate, integrated circuit, or transistor circuit is required, a reduction in size and costs associated with the system as a whole can be achieved. At power on/off time, moreover, a predetermined voltage is written into the pixels, while a voltage having the same level as that of the predetermined voltage is applied to the common-electrode-side of the pixels. This allows the screen to turn white in a normally white type display, and to turn black in a normally black type display. Image distortion at power on/off time can thus be prevented, while enabling a reduction in size and costs associated with the system as a whole.

The invention claimed is:

1. A liquid crystal display device, comprising:

a display unit wherein pixels are arranged in a matrix on a transparent insulating substrate; and wherein some of the circuitry for a voltage-generating means is mounted together with the display unit on the transparent insulating substrate and the voltage generating means applying a common voltage to a common-electrode-side of all the pixels at a time other than power on/of time, and alternatively applying a voltage having the same level as that of a predetermined voltage, instead of the common voltage, to the common-electrode-side of all the pixels at power on/off time.

2. A liquid crystal display device according to claim 1, wherein a switching means selects an output voltage of the voltage-generating means at power on/off time.

3. A liquid crystal display device according to claim 2, wherein the output voltage of the voltage-generating means is a voltage applied to the common electrodes of liquid crystal cells in the pixels, or a voltage applied to electrodes of storage capacitors via CS lines.

4. A liquid crystal display device according to claim 1, wherein a switching means selects an output voltage of the voltage-generating means at power on/off time; and wherein the output voltage of the voltage-generating means is a voltage applied to the common electrodes of liquid crystal cells in the pixels, or a voltage applied to the common electrodes of storage capacitors of the pixels via a CS line.

5. A method of controlling a liquid crystal display device, comprising both a display unit having pixels arranged in a matrix and voltage-generating means applying a common voltage to a common-electrode-side of all the pixels comprising:

writing a predetermined voltage into each pixel of the display unit for a certain period of time while the voltage-generating means applies a voltage having a same level as that of the predetermined voltage to the common-electrode-side of all the pixels;

wherein only some of the circuitry for the voltage-generating means is disposed on the same transparent insulating substrate as the pixel matrix of the display unit.

6. A method of controlling a liquid crystal display device as in claim 5 further comprising:

at a power off time, writing a predetermined voltage into each pixel of the display unit for a certain period of time while the voltage-generating means applies a voltage having the same level as that of the predetermined voltage to the common-electrode-side of all the pixels;

and turning the power off.

7. A method of controlling a liquid crystal display device comprising:

a display unit having pixels arranged in a matrix and voltage-generating means applying a common voltage to the common-electrode-side of all the pixels and after the liquid crystal display device has been powered on, at a power off time, writing a predetermined voltage into each pixel of the display unit for a certain period of time while the voltage-generating means applies a voltage having the same level as that of the predetermined voltage to the common-electrode-side of all the pixels; and turning the power off;

wherein only some of the circuitry for the voltage-generating means is disposed on a same transparent insulating substrate as the pixel matrix of the display unit.

* * * * *